(12) United States Patent
Larson et al.

(10) Patent No.: US 8,782,429 B2
(45) Date of Patent: Jul. 15, 2014

(54) SECURING EXECUTION OF COMPUTATIONAL RESOURCES

(75) Inventors: Brond Larson, Sharon, MA (US); Richard A. Shapiro, Arlington, MA (US)

(73) Assignee: Ab Initio Technology LLC, Lexington, MA (US)

(*) Notice: Subject to any disclaimer, the term of this patent is extended or adjusted under 35 U.S.C. 154(b) by 1003 days.

(21) Appl. No.: 12/646,059

(22) Filed: Dec. 23, 2009

(65) Prior Publication Data

US 2011/0154051 A1  Jun. 23, 2011

(51) Int. Cl.
*G06F 12/14* (2006.01)
*G06F 21/51* (2013.01)
*G06F 21/54* (2013.01)

(52) U.S. Cl.
CPC ............. *G06F 21/51* (2013.01); *G06F 21/54* (2013.01)
USPC ............... 713/189; 713/187; 726/26; 726/27; 726/29

(58) Field of Classification Search
CPC ......... G06F 21/44; G06F 21/57; G06F 21/64; G06F 21/629
See application file for complete search history.

(56) References Cited

U.S. PATENT DOCUMENTS

| | | | |
|---|---|---|---|
| 6,874,088 B1* | 3/2005 | Stevens | 726/6 |
| 2003/0115484 A1* | 6/2003 | Moriconi et al. | 713/201 |
| 2005/0091658 A1* | 4/2005 | Kavalam et al. | 718/104 |
| 2007/0043943 A1* | 2/2007 | Peretti | 713/167 |
| 2007/0186112 A1 | 8/2007 | Perlin et al. | |
| 2008/0077922 A1* | 3/2008 | Doring | 718/100 |
| 2008/0134304 A1 | 6/2008 | Kim et al. | |
| 2009/0094673 A1 | 4/2009 | Seguin et al. | |

FOREIGN PATENT DOCUMENTS

EP    1526429    4/2005

OTHER PUBLICATIONS

International Preliminary Report on Patentability, PCT, dated Jun. 26, 2012.
International Search Report & Written Opinion issued in PCT application No. PCT/US2010/061517, mailed May 10, 2011, 12 pages.

* cited by examiner

*Primary Examiner* — Matthew Henning
(74) *Attorney, Agent, or Firm* — Fish & Richardson P.C.

(57) ABSTRACT

Controlling access to computational features includes: preparing a computational resource for execution by an execution system that has been provided a primary descriptor containing an identity value and that has associated a feature indicator with the primary descriptor; accessing a secondary descriptor containing the identity value and cryptographically assigned to the computational resource; and granting the computational resource access to a computational feature of the execution system based on the feature indicator.

34 Claims, 18 Drawing Sheets

US 8,782,429 B2

SECURING EXECUTION OF COMPUTATIONAL RESOURCES

BACKGROUND

This description relates to securing the execution of computational resources.

Vendors of computational resources, such as computer software, take risks when supplying those resources to third parties. A vendor may wish to limit access to certain elements of the computational resources. In some cases, some parties should be granted access to certain elements, while others are denied access. In other cases, certain aspects of the resources should be obscured from all parties. A malicious actor may attempt to circumvent the restrictions placed on the resources.

SUMMARY

In one aspect, in general, a method of controlling access to computational features includes: preparing a computational resource for execution by an execution system that has been provided a primary descriptor containing an identity value and that has associated a feature indicator with the primary descriptor; accessing a secondary descriptor containing the identity value and cryptographically assigned to the computational resource; and granting the computational resource access to a computational feature of the execution system based on the feature indicator.

Aspects can include one or more of the following features.

The computational resource is encrypted.

Cryptographically assigning the secondary descriptor to a computational resource includes combining the resource with the secondary descriptor, and cryptographically signing the combination.

Cryptographically signing the combination includes encrypting a value derived from the combination using a private encryption key assigned to the primary descriptor.

The method further includes verifying the secondary descriptor cryptographically assigned to the computational resource during an execution of the computational resource.

Verifying the secondary descriptor includes decrypting a value derived from the combination of the computational resource and the secondary descriptor using a public encryption key assigned to the primary descriptor.

The method further includes generating a first instance of the secondary descriptor before executing the computational resource; generating a second instance of the secondary descriptor before executing the computational resource; and comparing the two instances of the descriptor to determine if the computational resource is authorized to execute.

The method further includes encrypting the first instance of the secondary descriptor.

The method further includes encrypting the second instance of the secondary descriptor.

The first instance of the secondary descriptor has a first data value in common with the second instance of the secondary descriptor, and a second data value not in common with the second instance of the secondary descriptor.

The method further includes assigning to the computational resource and the first instance of the secondary descriptor an inner container having instructions to execute the computational resource, and assigning to the inner container and the second instance of the secondary descriptor an outer container representing as data the instructions to execute the computational resource.

The method further includes cryptographically signing the outer container.

The method further includes accepting an instruction from the computational resource to access a second computational resource; executing the second computational resource on a system; cryptographically assigning the secondary descriptor to the second computational resource; and providing access to a computational feature, based on the feature indicator, to the second executed computational resource.

The second computational resource continues execution after the first computational resource has completed execution.

The computational resource is executed on a first system and the second computational resource is executed on a second system.

Cryptographically assigning the secondary descriptor to the second computational resource includes accessing a storage location containing an instance of the secondary descriptor.

The method further includes accessing a second computational resource, cryptographically assigned to a second secondary descriptor containing a second identity value; executing the second computational resource; accessing a second feature indicator cryptographically assigned to a second primary descriptor containing a second identity value; providing, to the executed second computational resource, access to a computational feature based on the second feature indicator.

In another aspect, in general, a system for controlling access to computational features includes a development computer system configured to prepare a computational resource for execution including providing a primary descriptor containing an identity value; and an execution computer system configured to execute the computational resource. Executing the computational resource includes associating a feature indicator with the primary descriptor; accessing a secondary descriptor containing the identity value and cryptographically assigned to the computational resource; and granting the computational resource access to a computational feature of the execution system based on the feature indicator.

In another aspect, in general, a system for controlling access to computational features includes means for preparing a computational resource for execution including providing a primary descriptor containing an identity value; and means for executing the computational resource. Executing the computational resource includes associating a feature indicator with the primary descriptor; accessing a secondary descriptor containing the identity value and cryptographically assigned to the computational resource; and granting the computational resource access to a computational feature based on the feature indicator.

In another aspect, in general, a computer-readable medium stores a computer program for controlling access to computational features. The computer program includes instructions for causing a computer to: prepare a computational resource for execution by an execution system that has been provided a primary descriptor containing an identity value and that has associated a feature indicator with the primary descriptor; access a secondary descriptor containing the identity value and cryptographically assigned to the computational resource; and grant the computational resource access to a computational feature of the execution system based on the feature indicator.

Aspects can include one or more of the following advantages.

By cryptographically assigning a descriptor to a computational resource, the assignment cannot be changed without authorization. By providing access to a computational feature based on a feature indicator assigned to the descriptor, a computational feature cannot be accessed without authorization.

Other features and advantages of the invention will become apparent from the following description, and from the claims.

DESCRIPTION

1 Overview

When a computational resource is executed on a computational system, the resource can operate in a certain way, and access certain features of the computational system. A malicious actor executing the resource may attempt to use security flaws to overcome any limits imposed upon the execution by the supplier or authority of the resource. For example, the malicious actor may try to modify the resource itself to operate in a way that uses features of the system that the resource was not originally designed to use. Thus, the computational system may protect the integrity of an associated computational resource to ensure that no actor can modify or tamper with the resource without authorization. In some cases, the authority of the resource may also wish to prevent any actor from accessing the underlying structure or design of the resource, even if that actor is permitted to execute the resource.

Further, the authority of a computational resource may be a different entity than the authority of a computational system upon which the resource is executed. For example, a system authority that provides system software for the computational system may enable a resource authority to develop software modules as a resource for use with the system software. In this case, the system authority may wish to allow the resource authority access to some features of the system, but not others. Thus, the system may have a mechanism to provide a computational resource access to a particular set of available features, and also provide other computational resources access to other respective sets of available features, where the sets may or may not overlap with each other.

A complex computational system may be associated with many different computational resources, all of which may execute in the form of multiple instances of those computational resources and may interact with each other. For example, the system may execute one computational resource, which in turn causes the execution of a second computational resource. At the same time, a third computational resource may cause the execution of another instance of the second computational resource. This kind of complex computational system may have a mechanism to keep track of which instances of a computational resource are associated with which other instances of a computational resource. Further, the system may use this information to allow access to certain features based on the access privileges of only one of the computational resources, such as the first resource executed by an operator or user. In this scenario, all of the executed instances of a computational resource associated with the first computational resource will only have access to the features accessible to the first computational resource.

Figure 1A:
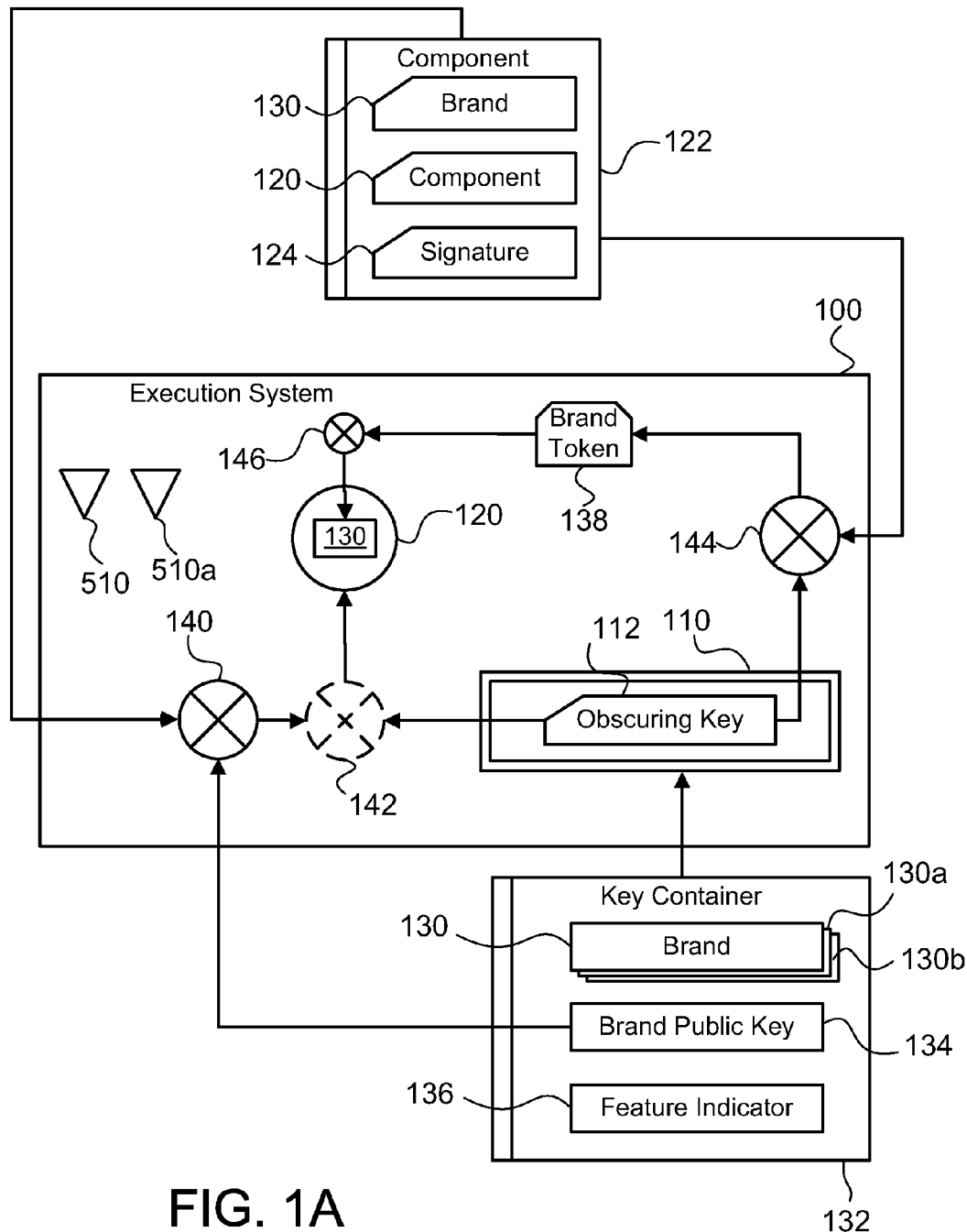
FIG. 1A is an overview of an execution system and associated components.

FIG. 1A is a block diagram of one exemplary arrangement of a computational system showing the interrelationship between associated principal elements. An execution system 100 includes an execution module 110, which handles executable component 120. An executable component 120 includes any discrete computational constituent that can be executed, such as a computer program, software code, or another kind of executable element.

An executable component 120 can be stored in a component container 122. Optionally, the executable component 120 in the component container 122 may be encrypted using a symmetric obscuring key 112 available to the execution system 100. The component container 122 also has other information related to the executable component 120, including a brand 130 and an electronic component signature 124. A brand 130 is an identity for the component that indicates which features 510, 510a can be used with this component. A component associated with a brand 130 has access to the same features 510, 510a as other components that identify with the same brand. The features 510, 510a may be different elements of the execution system 100. For example, a feature 510, 510a could correspond to a command, an instruction, a software process, a hardware device, a data file, some other kind of element, or any combination of these.

The execution system 100 has access to a key container 132 that also contains one or more brands 130, 130a, 130b. The execution module 110 receives the key container 132 as input. The relationships of some portions of the system as input to other portions of the system is represented in the figure by an arrow, which is the convention used throughout the figures in this description. Each brand 130 in the key container 132 is associated with a brand public key 134. The execution system 100 uses the brand public key 134 to verify that a brand 130 in a component container 122 is valid. Each brand 130 is also associated with a feature indicator 136, which describes the features 510, 510a of the execution system 100 that are associated with the brand 130. A component 120 associated with a brand 130 can only access features 510, 510a described by the feature indicator 136.

The execution system 100 executes an executable component 120 by accessing the component container 122. The execution system 100 has a signature verification module 140 that determines if the component signature 124 is valid. The signature verification module 140 uses the brand public key 134 to perform this validity check. If the executable component 120 is encrypted, the signature verification module 140 passes the validated component container 122 to a decryption module 142 to be decrypted, using the obscuring key 112. The executable component 120 is then made available to the execution system 100.

The execution system 100 also has a brand tokenization module 144. The brand tokenization module 144 prepares a brand token 138 containing the brand 130 associated with the component 120. The brand token 138 is used to maintain the brand 130 association with the component 120 while the component is executing.

When the execution module 110 executes the component 120, the brand tokenization module 144 securely attaches the brand token 138 to the component 120. During execution, the component 120 can only access features of the execution system 100 described by the feature indicator 136 associated with the brand 130 in the brand token 138.

Figure 1B:
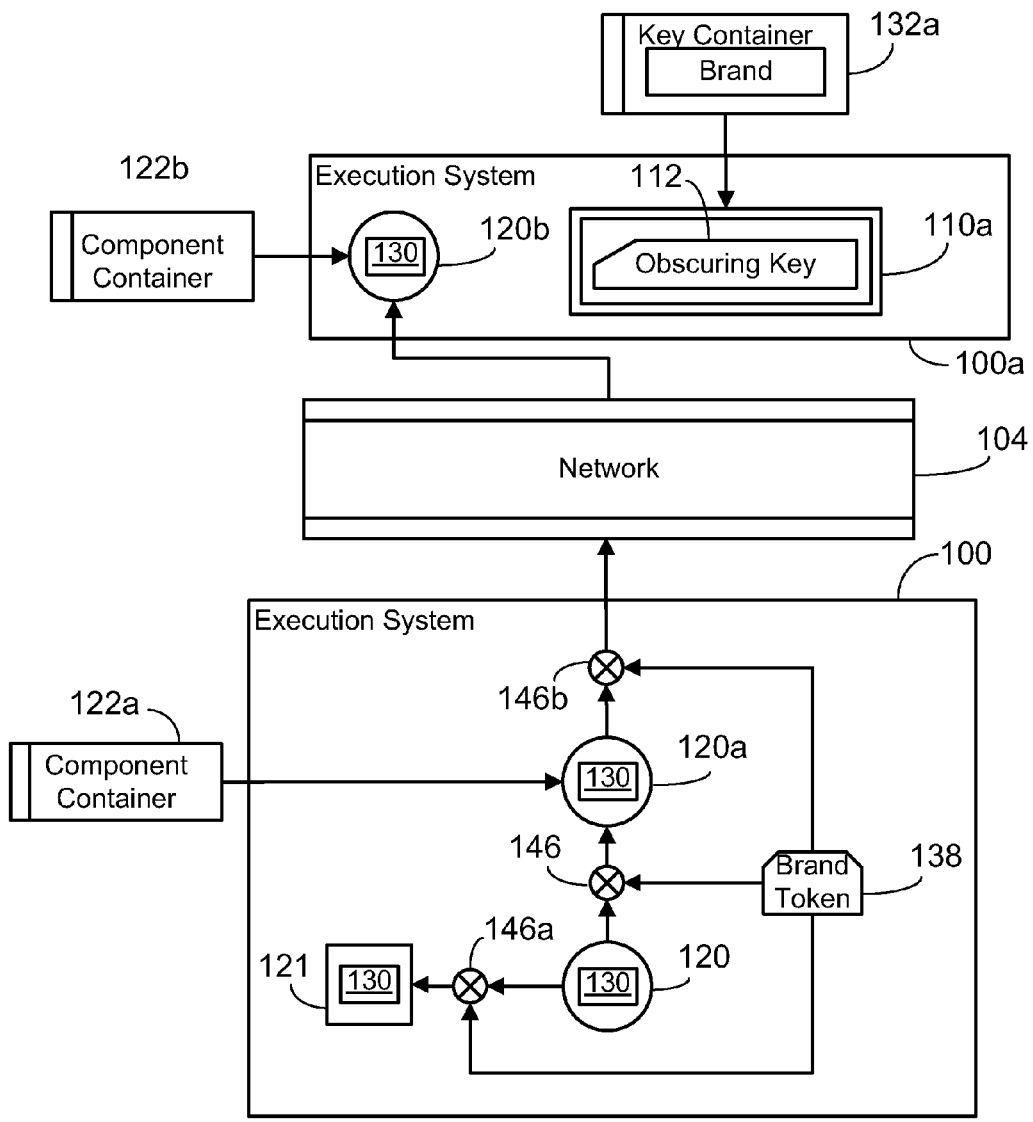
FIG. 1B is an overview of an execution system and associated components.

FIG. 1B is a block diagram of another exemplary arrangement of the computational system. In FIG. 1B, the brand token 138 is also used to associate a brand 130 with other executable components 120*a*. If an executable component 120 causes the execution of an instance of another executable component 120*a*, an execution context module 146 will allow the brand token 138 to be attached to that other executable component 120*a*. Thus, the other executable component 120*a* will only be able to access features described by the feature indicator 136 associated with the brand 130 in the brand token 138, even if the other executable component 120*a* did not have a brand 130 in its component container 122*a*. The brand token 138 can also be attached to a non-executable component, such as a data component 121, using the execution context module 146*a*. The execution context module is shown as multiple instances 146, 146*a*, 146*b* in the figure, but depending on the implementation, only one instance may be necessary.

One of the executable components 120, 120*a* may also access an executable component 120*b* on another execution system 100*a*, such as a secondary or remote system accessed over a network 104. The other execution system 100*a* also has an execution module 110*a* capable of accessing the obscuring key 112, and has access to a key container 132*a* containing the brand 130. The execution context module 146*b* can allow the brand token 138 to be attached to the executable component 120*b* handled by the other execution system 100*a*. Thus, the executable component 120*b* will operate under the brand 130, even if the component container 122*b* does not contain the brand 130. The execution system 100 may interact with the other execution system 100*a* according to a standard network protocol, a standard remote procedure call protocol, a custom-tailored protocol, another kind of protocol, or any combination of these.

In some implementations, an executable component 120 is implemented using a "dataflow graph" that is represented by a directed graph, with vertices in the graph representing components (either data components 121 or executable components 120), and the directed links or "edges" in the graph representing flows of data between components. A graph is a modular entity. Each graph can be made up of one or more other graphs, and a particular graph can be a component in a larger graph. A graphical development environment (GDE) provides a user interface for specifying executable graphs and defining parameters for the graph components. A system that implements such graph-based computations is described in U.S. Pat. No. 5,966,072, EXECUTING COMPUTATIONS EXPRESSED AS GRAPHS, which is incorporated by reference herein in its entirety.

Figure 2A:
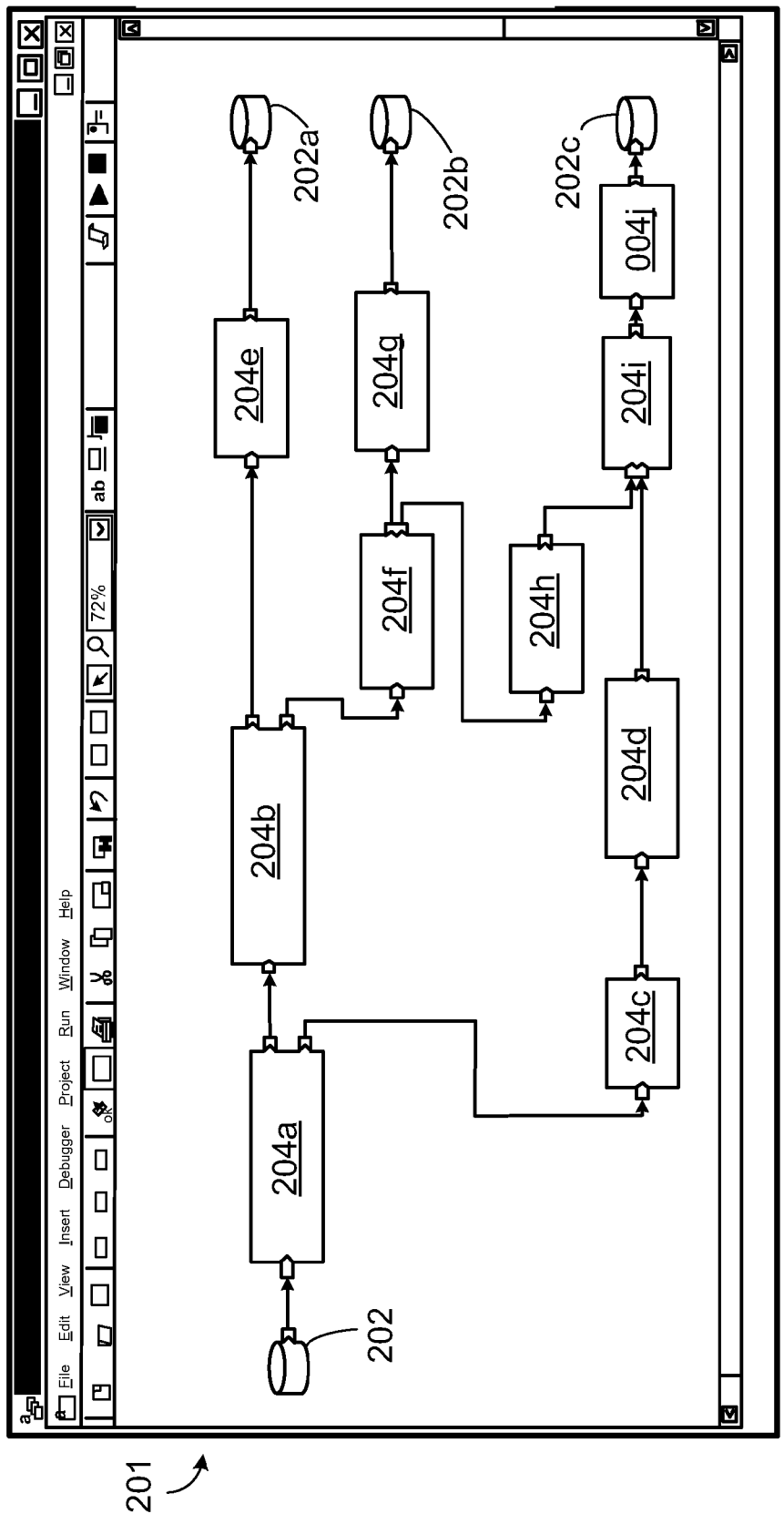
FIG. 2A is a block diagram of a dataflow graph.

Referring to FIG. 2A, an example of a dataflow graph 201 includes an input data set component 202 providing a collection of data to be processed by the executable components 204*a*-204*j* of the dataflow graph 201. For example, the data set component 202 can include data records associated with a database system or transactions associated with a transaction processing system. Each executable component 204*a*-204*j* is associated with a portion of the computation defined by the overall dataflow graph 201. Work elements (e.g., individual data records from the data collection) enter one or more input ports of a component, and output work elements (which are in some cases the input work elements, or processed versions of the input work elements) typically leave one or more output ports of the component. In graph 201, output work elements from components 204*e*, 204*g*, and 204*j* are stored in output data set components 202*a*-202*c*.

Figure 2B:
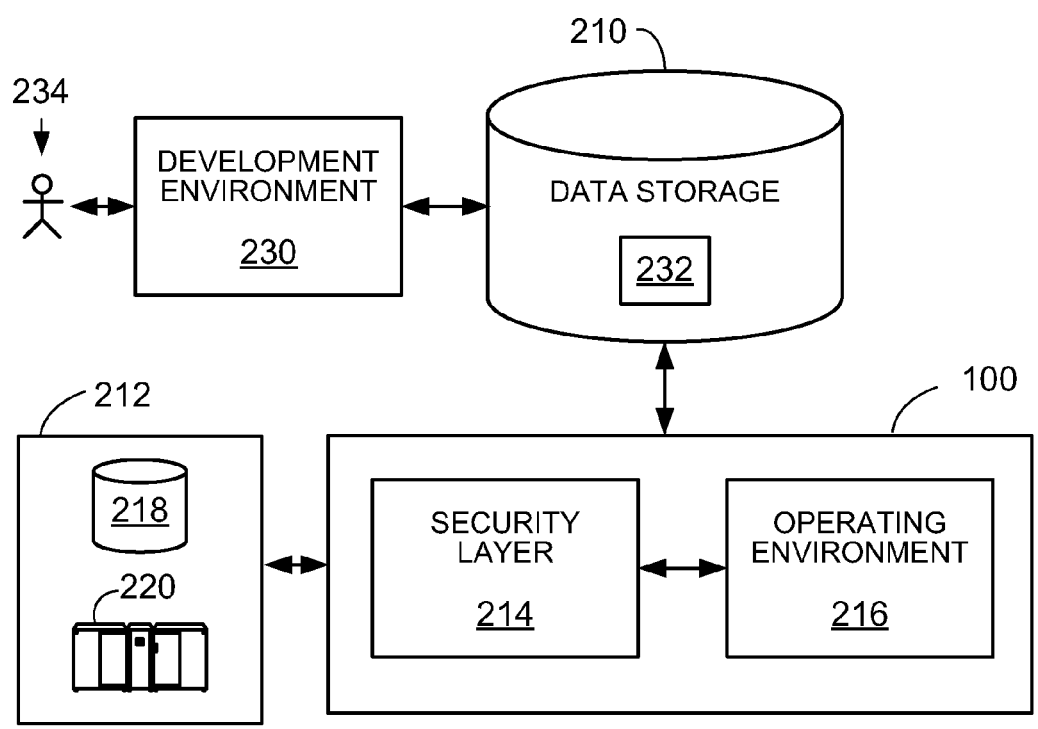
FIG. 2B is a block diagram of an execution system.

FIG. 2B shows an exemplary execution system 100 coupled to a storage system 210 and configured to process data received from a data source 212 to be processed using one or more secured programs such as dataflow graphs. The data source 212 may include one or more sources of data such as storage devices or connections to online data streams, each of which may store data in any of a variety of storage formats (e.g., database tables, spreadsheet files, flat text files, or a native format used by a mainframe). The execution system 100 includes a security layer 214 that provides security using the descriptors (e.g., key containers) described herein stored in the storage system 210, and an operating system 216. In some implementations, the security layer 214 is part of the operating system 216.

The execution system 100 receives data from the data source 212 for processing. Storage devices providing the data source 212 may be local to the execution system 100, for example, being stored on a storage medium connected to a computer running the operating system 216 (e.g., hard drive 218), or may be remote to the execution system 100, for example, being hosted on a remote system (e.g., mainframe 220) in communication with a computer running the operating system 216, over a remote connection.

The data storage system 210 may receive a secured program 232 that has been developed by a developer 234 in a development system 230. The developer 234 is able to develop secured programs for execution in the execution system 100, with the development system 230 configured to cryptographically assign descriptors as described herein. The development system 230 is, in some implementations, a system for developing applications as dataflow graphs (e.g., using the GDE described above). In addition to features described herein, other features of such a system are described in more detail, for example, in U.S. Publication No. 2007/0011668, entitled "Managing Parameters for Graph-Based Applications," incorporated herein by reference.

The development system 230 and the execution system 100 may each be hosted on one or more general-purpose computer systems under the control of a suitable operating system, such as the UNIX operating system, and the storage system 210 can include storage media integrated with or in communication with the computer system. For example, the computer systems can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely dis-

2 Containers

Figure 3A:
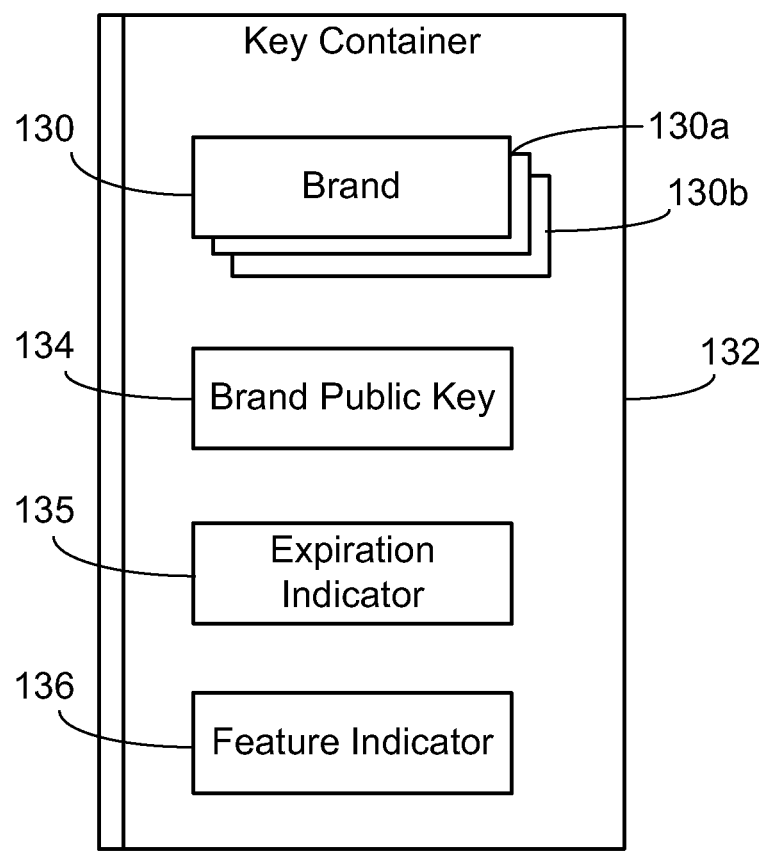
FIG. 3A is a block diagram of a key container.

As shown in FIG. 3A, the key container 132 can contain multiple brands 130, 130a, 130b. One executable component 120 may operate according to one brand 130a, and another may operate according to another brand 130b. The execution system 100 handles an executable component 120 if the brand 130 associated with the component is available in the key container 132. In some examples, the key container 132 could be a data file, a memory location, or another kind of container.

Each brand 130 has a corresponding public key 134, which allows the signature verification module 140 to determine if the association between an executable component 120 and a brand 130 is valid. Each brand 130 also has an expiration indicator 135, which allows a brand authority to set a time period in which a brand 130 is valid. Further, each brand 130 has a feature indicator 136, which describes the features 510 of the execution system 100 available to an executable component 120 operating according to this brand 130.

Figure 3B:
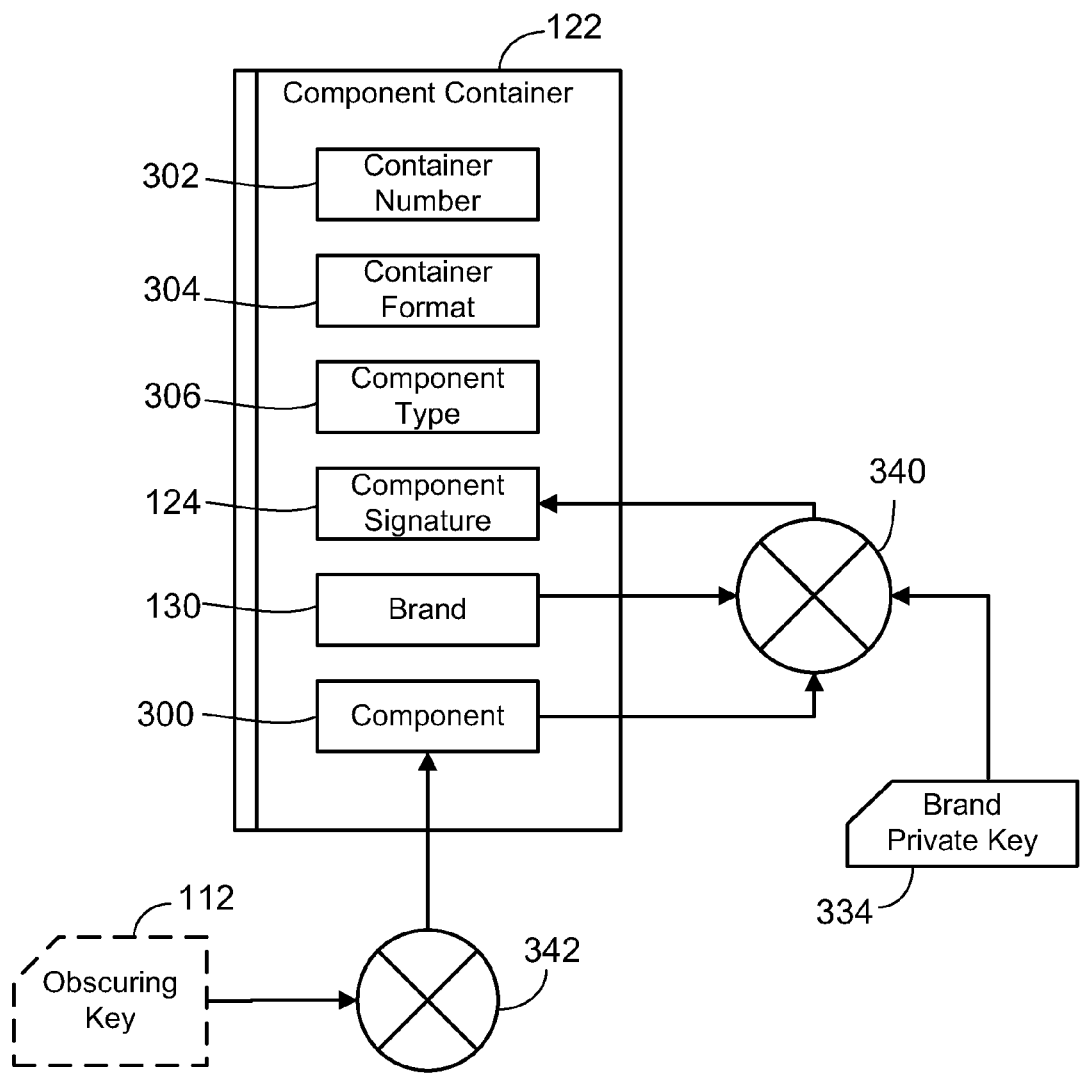
FIG. 3B is a block diagram of a component container.

As shown in FIG. 3B, the component container 122 has elements relating to a component 300. The component 300 may be an executable component 120, for example. In some examples, other types of components 300 can be used, such as a data component 121 having information used by an executable component 120, but not itself executable. In some examples, the component container 122 could be a data file, a memory location, or another kind of container.

The component 300 is optionally encrypted to obscure the structure or contents of the component from unauthorized viewing or analysis. An encryption module 342 uses the obscuring key 112 to encrypt the component 300. The encryption module 342 may be based on a standard encryption protocol, such as the Data Encryption Standard (DES), the Advanced Encryption Standard (AES), another standard encryption protocol, or a combination of these. The encryption module 342 may use a custom-tailored encryption protocol, alone or in concert with a standard encryption protocol.

The component container 122 contains a brand 130 associated with the component 300. The brand 130 is used to assign a set of features to the component 300.

The component container 122 has the component signature 124, used to check the validity of the contents of the component container 122. A signature generation module 340 creates the component signature 124 by processing the component 300 and the brand 130 according to an electronic signature protocol. The protocol may be a standard cryptographic protocol used for electronic signatures, such as RSA, Digital Signature Algorithm (DSA), an elliptic curve protocol, or another kind of cryptographic protocol. The signature generation module 340 may use a custom-tailored electronic signature protocol, alone or in concert with a standard encryption protocol.

The component signature 124 is generated using a brand private key 334. The brand private key 334 is available to an authority of the component container 122, and is not available at an execution system 100 handling the component 300. The execution system 100 can only verify that the brand 130 and the component 300 have not been altered since the component signature 124 was generated. Thus, the component signature 124 is a cryptographically secure means of associating the brand 130 with the component 300, as well as ensuring the integrity of the component 300.

Further, the component container 122 has a container number 302, which is a unique identifier for this component container 122. It also has a container format 304, which indicates the particular arrangement of the data that makes up this component container 122. The component container 122 also has a component type 306, which indicates the particular arrangement of the data that makes up the component 300 contained within, including whether or not the component 300 has been encrypted.

3 Brand Tokenization

As described above, the execution system 100 attaches a brand token 138 to executable components 120, 120a, 120b to associate a brand 130 with each component prior to execution. The execution system 100 takes these tokenization steps in advance of each execution to make this association secure, so that if a malicious actor attempts to intercept the execution process to alter or replace the brand 130, this malicious action can be detected.

Figure 4A:
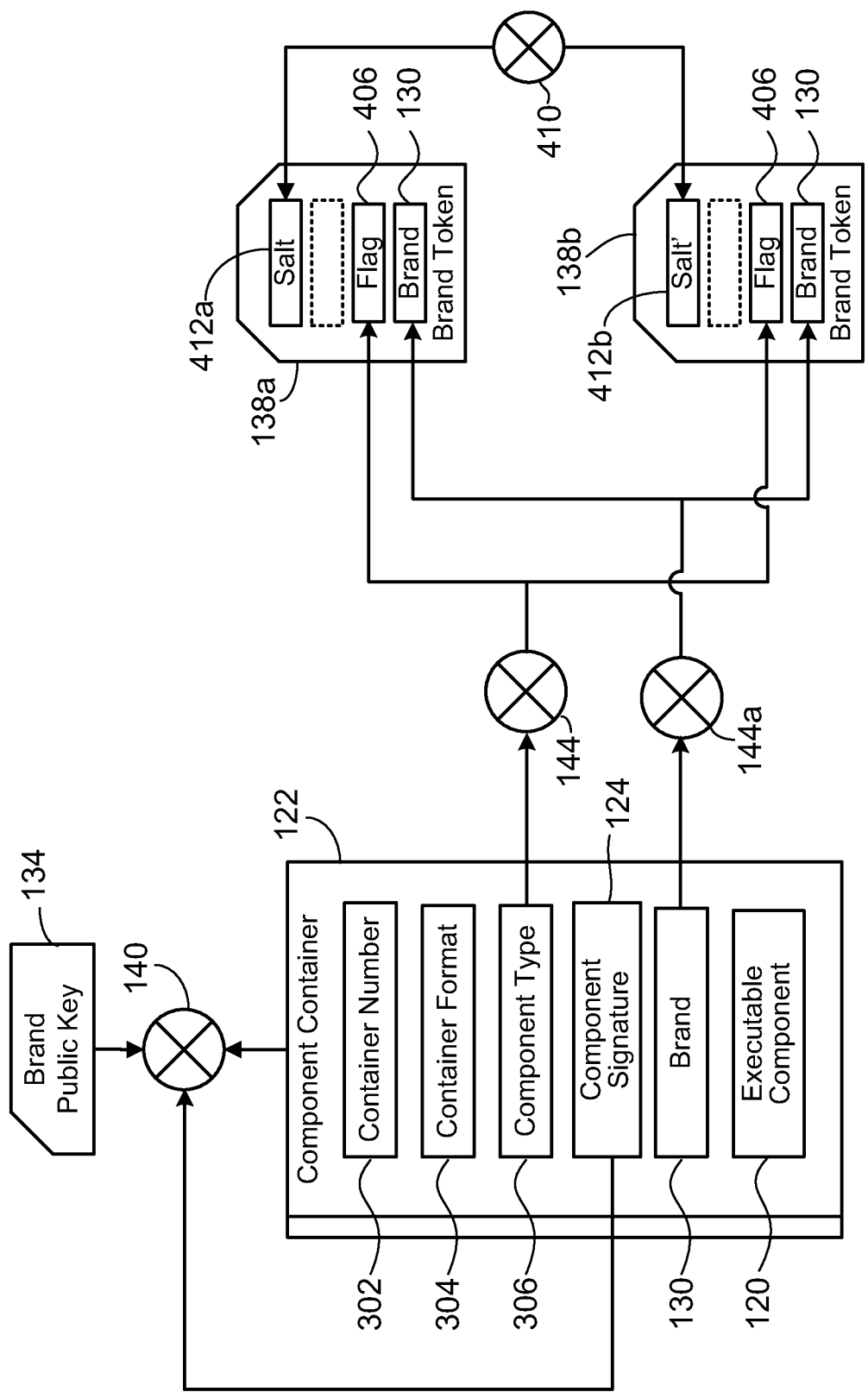
FIG. 4A is a portion of the execution system for generating brand tokens.

As shown in FIG. 4A, the execution system 100 uses multiple instances of the brand token 138a, 138b. Each instance is generated from the component container of a component, which in this example is the component container 122 of the executable component 120.

The execution system 100 verifies the component signature 124 using the signature verification module 140. The signature verification module 140 uses the brand public key 134 to determine if the executable component 120 or the brand 130 have been modified or otherwise tampered with at some time after the component container 122 was created. If either the executable component 120 or brand 130 has been tampered with, the signature verification module 140 will detect the discrepancy and reject the component container 122.

The brand tokenization module 144, 144a uses the contents of the component container 122 to generate the brand token instances 138a, 138b. Two instances of the brand tokenization module are shown, but in some implementations, only one instance may be necessary. The brand tokenization module 144, 144a places the brand 130 from the component container into each instance of the brand token 138a, 138b. The brand tokenization module 144 also uses the component type 306 to generate a flag 406 indicating if the executable component 120 is encrypted.

Further, a random number generator 410 creates a different salt 412 for each instance of the brand token 138a, 138b. Thus, each instance of the brand token 138a, 138b will contain a unique random value different from the other instances.

Figure 4B:
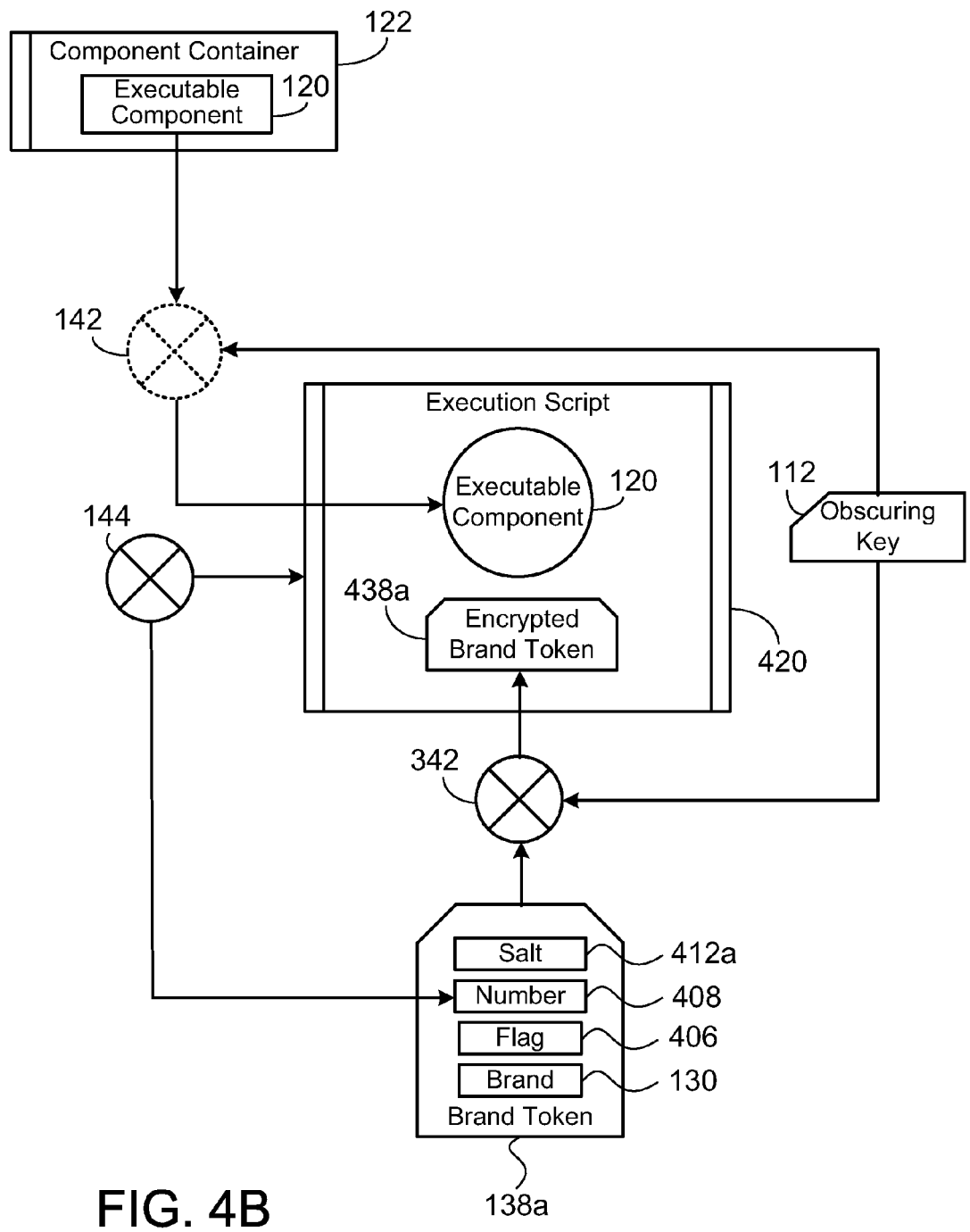
FIG. 4B is a portion of the execution system for generating an execution script.

As shown in FIG. 4B, the brand tokenization module 144 generates an execution script 420. The execution script 420 contains instructions for executing an instance of the executable component 120, and can take any of several forms. The execution script 420 may be a set of interpreted or compiled commands indicating to the execution module 110 specific information needed to properly handle the executable component 120.

The executable component 120 is associated with the execution script 420. For example, the execution script 420 may then contain the instructions making up the executable component 120 itself, or it may instead have a pointer or reference to the executable component 120. One of the instructions in the execution script 420 may access this pointer or reference.

If the executable component 120 was encrypted before being placed in the component container 122, the decryption module 142 handles decrypting the executable component 120 using the obscuring key 112.

One of the instances of the brand token 138a is used with the execution script 420. The brand tokenization module 144 completes the brand token instance 138a by generating an execution number 408 and placing it in the brand token instance 138a. The same execution number 408 applies to all instances of the brand token 138 used in the tokenization process for this execution of the executable component 120. The brand tokenization module 144 keeps track of the execution number 408 it assigns to this instance of the brand token 138a, and will use the same execution number 408 for the other instances.

Once the brand token instance 138a is complete, the encryption module 342 encrypts the brand token instance using the obscuring key 112. The brand tokenization module 144 then places the encrypted brand token 438a in the execution script 420. As with the executable component 120, the execution script 420 may then contain the data making up the encrypted brand token 438a itself, or it may instead have a pointer or reference to the encrypted brand token 438a.

Figure 4C:
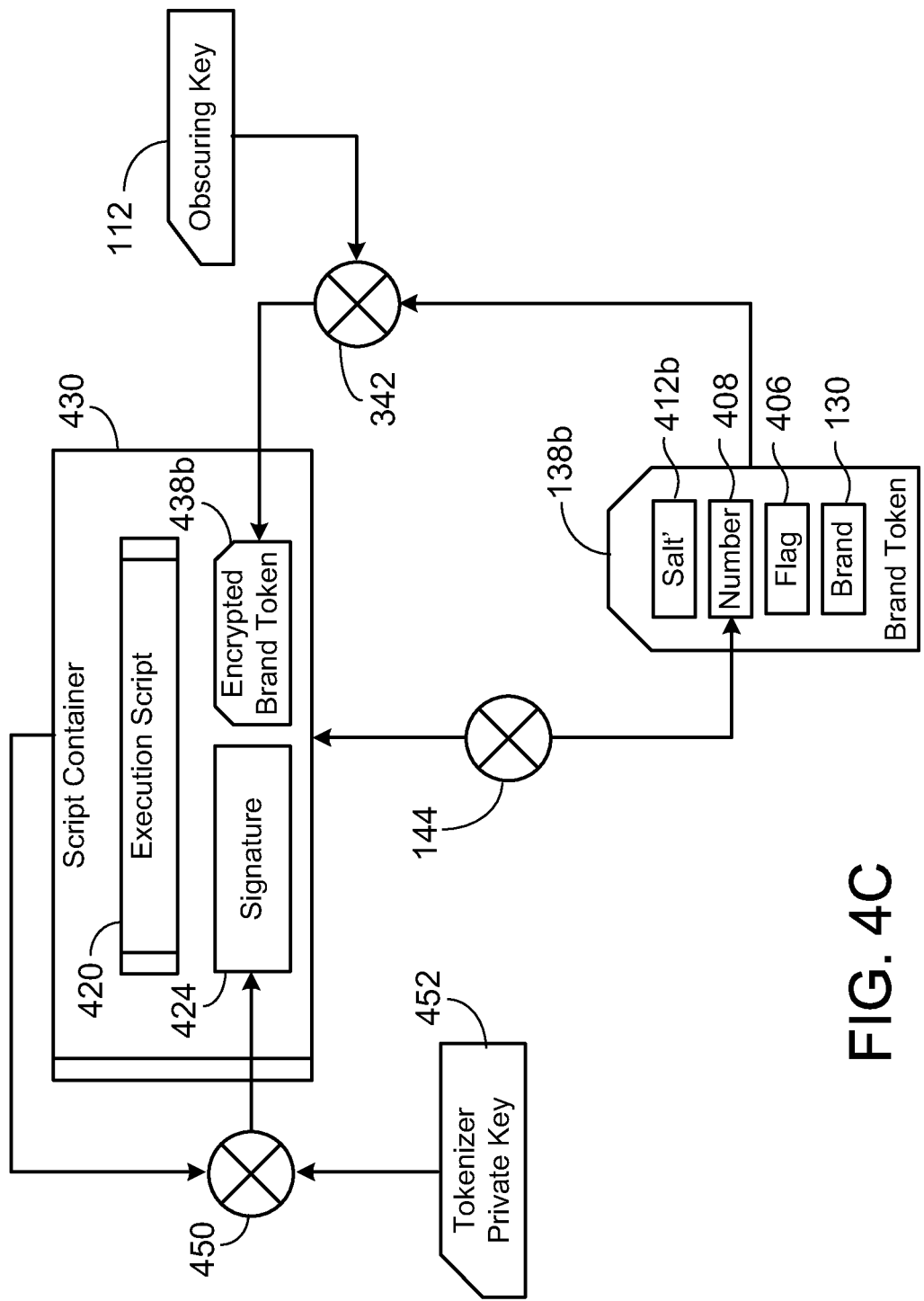
FIG. 4C is a portion of the execution system for generating a script container.

As shown in FIG. 4C, the brand tokenization module 144 generates a script container 430 and places the execution script 420 inside. In some implementations, the script container 430 is a data file or a data structure. The brand tokenization module 144 also completes the second instance of the brand token 138b by adding the same execution number 408 used for the first instance of the brand token 138a. The second instance of the brand token 138b is encrypted with the encryption module 342 and the encrypted brand token 438b is placed inside the script container 430.

The tokenization signature generation module 450 generates a script container signature 424 based on the script container 430. The tokenization signature generation module 450 uses a tokenizer private key 452 available at the execution system 100. The script container signature 424 provides a mechanism of ensuring the validity of the script container 430 when the component execution commences.

The tokenization signature generation module 450 operates in a similar fashion to other signature generation modules described elsewhere and creates the script container signature 424 by processing the script container 430 according to an electronic signature protocol. The protocol may be a standard cryptographic protocol used for electronic signatures, such as RSA, Digital Signature Algorithm (DSA), an elliptic curve protocol, or another kind of cryptographic protocol. The tokenization signature generation module 450 may use a custom-tailored electronic signature protocol, alone or in concert with a standard encryption protocol. After the script container 430 is established, the executable component 120 is prepared for secure execution.

4 Branded Execution

Figure 5A:
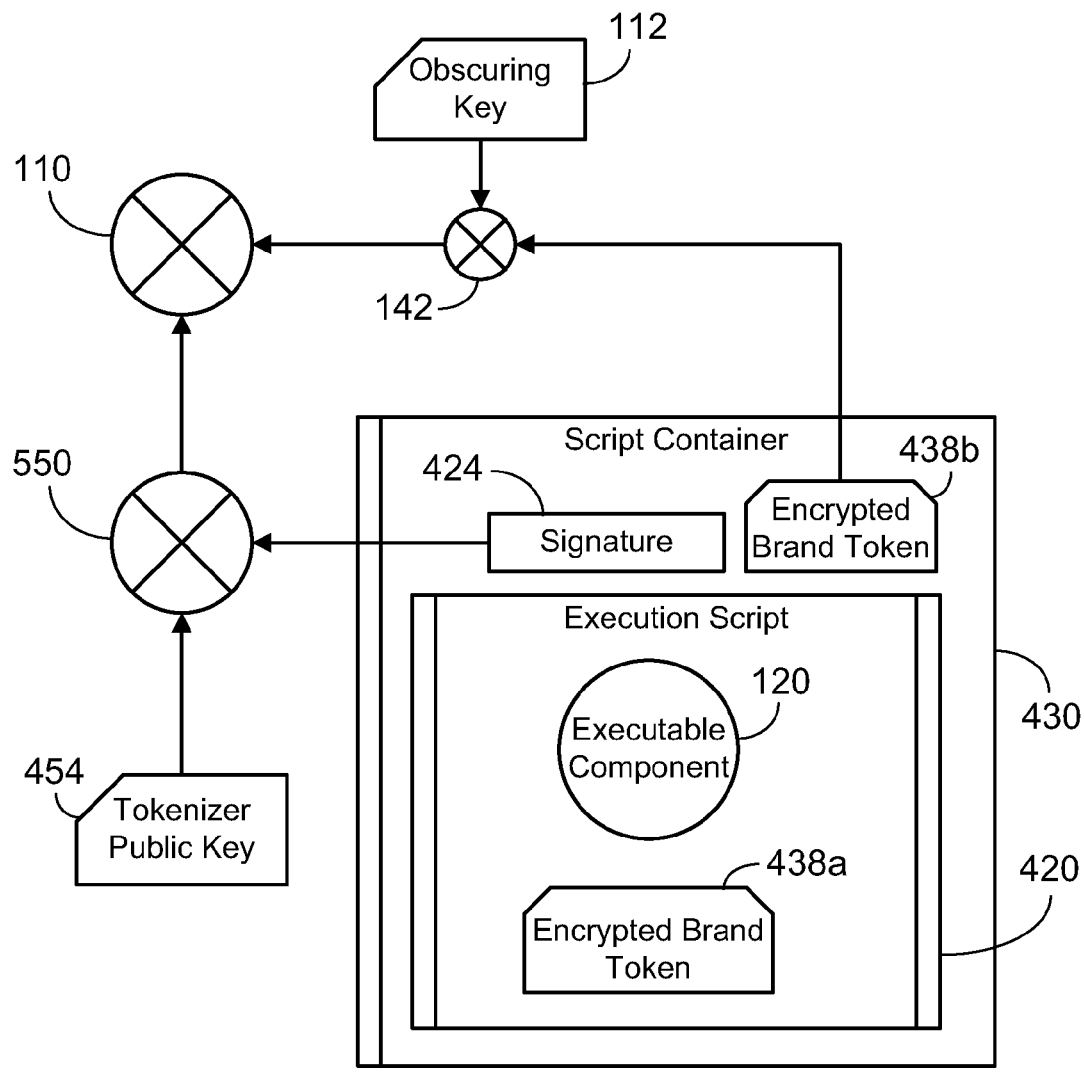
FIG. 5A is a portion of the execution system for accessing a script container.

As shown in FIG. 5A, the execution module 110 receives a script container 430 containing an executable component 120. The execution module 110 carries out the steps needed to verify the contents of the script container 430, which has been structured to allow for the secure execution of the executable component 120.

The execution module 110 verifies the script container signature 424 using the container signature verification module 550. The container signature verification module 550 uses the container public key 454 to determine if the script container 430 has been modified or otherwise tampered with at some time after the script container 430 was created. The container signature verification module 550 will detect any discrepancy and reject the script container 430. The execution module 110 also extracts the encrypted brand token 438b from the verified script container 430 and applies the decryption module 142, using the obscuring key 112.

Figure 5B:
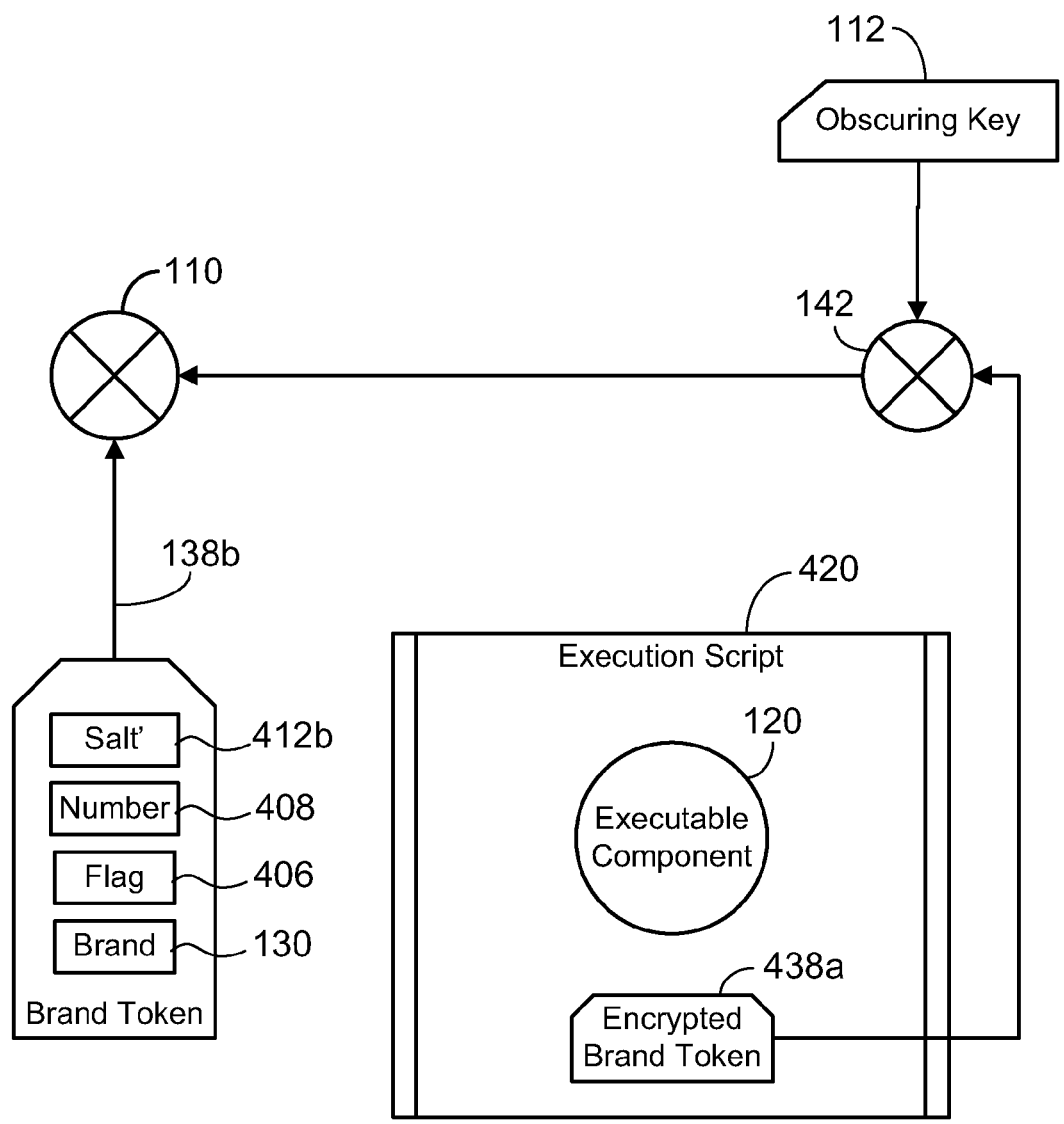
FIG. 5B is a portion of the execution system for accessing an execution script.

As shown in FIG. 5B, the execution module 110 acquires the decrypted instance of the brand token 138b, which was previously decrypted by the decryption module 142. The execution module 110 also carries out the instructions contained in the execution script 420, which was previously acquired from the verified script container 430. The execution script 420 contains the executable component 120, as well as another encrypted brand token 438a. The execution module 110 applies the decryption module 142 to this encrypted brand token 438a.

Figure 5C:
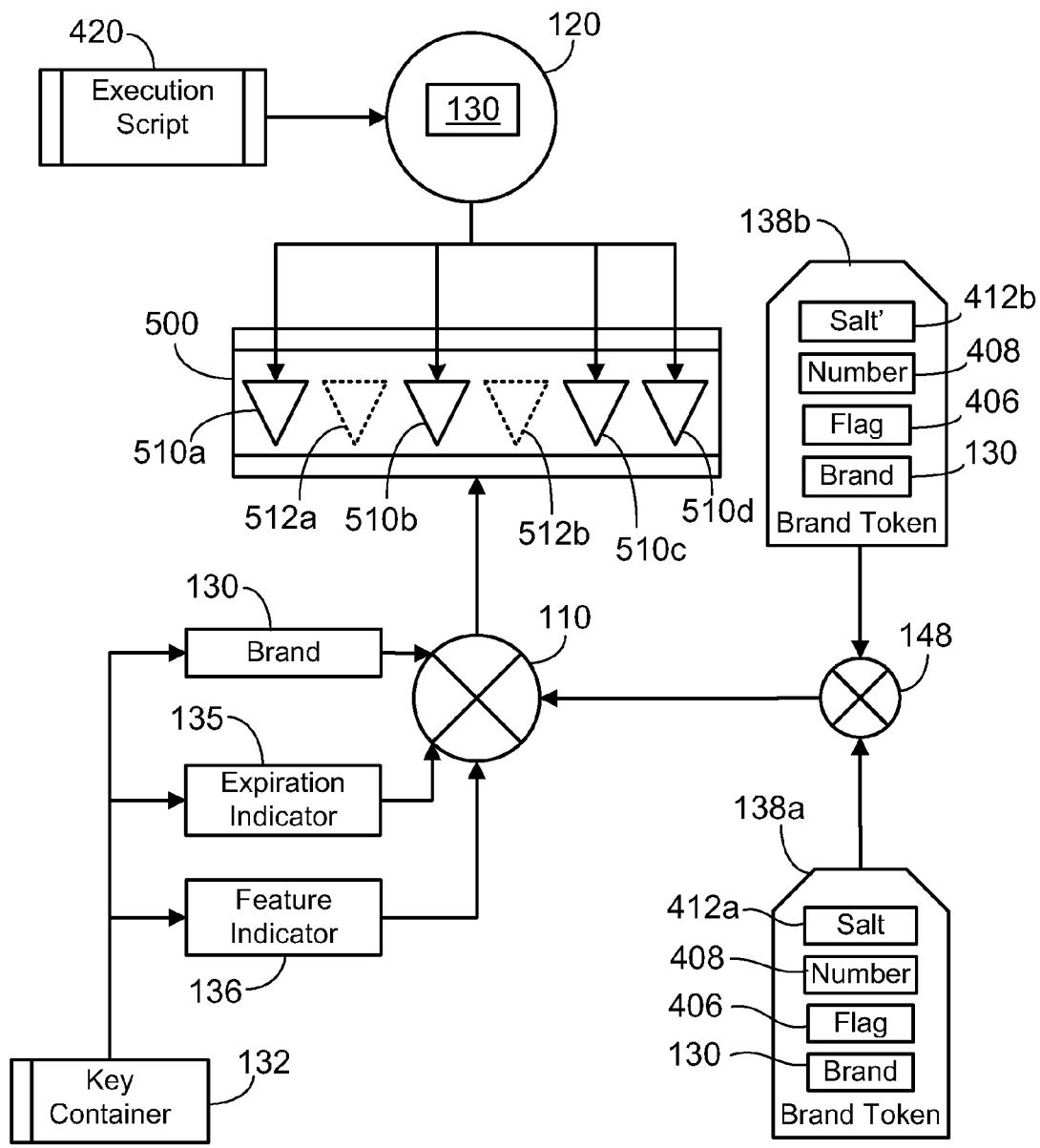
FIG. 5C is a portion of the execution system for enabling and disabling features.

As shown in FIG. 5C, a token verification module 148 compares the contents of the first instance of the brand token 138a, extracted from the execution script 420, and the second instance of the brand token 138b, extracted from the script container 430. Two instances of the brand token 138a, 138b as created by the brand tokenization module 144 will have identical contents except for the random salts 412a, 412b. If the salts 412a, 412b are different, but the contents are otherwise the same, including the brand 130 and execution number 408, then the token verification module 148 will provide the verified brand 130 to the execution module 110.

Because one instance of the brand token 138a arrived at the execution module 110 with the execution script 420, and another instance of the brand token 138b arrived with the script container 430, the two instances of the brand token 138a, 138b can be used to verify the authenticity of the executable component 120 and its association with a brand 130. Any particular execution script 420 cannot be re-used by placing it inside a new script container 430, because the new script container 430 will not have a brand token 138 with a matching execution number 408. The brand token instance 138a from the execution script 420 cannot be used with the script container 430, because the brand token instances from the execution script 420 and the script container 430 will not have a different random salt 412a, 412b, as expected by the execution module 110. Further, a new brand token instance for the script container 430 cannot be generated from the brand token instance 138a inside the execution script 420 by an unauthorized actor, because the brand token instance 138a is encrypted with the obscuring key 112 as encrypted brand token 438a.

When the execution module 110 is notified by the token verification module 148 that the brand token instances 138a, 138b represent a valid brand 130, the execution module 110 accesses the key container 132 to access the expiration indicator 135 and feature indicator 136 associated with the brand 130 in the key container corresponding to the brand 130 in the brand token instances 138a, 138b. The execution module 110 uses the feature indication 136 to enable some features 510a, 510b, 510c, 510d in the feature set 500 available to an executable component, and disable other features 512a, 512b in the feature set 500.

The execution module 110 accesses the executable component 120 from the execution script 420, and allows it to execute using only the features 510 enabled according to the feature indicator 120 of the brand 130.

5 Maintaining Branded Execution Context

An executable component 120 associated with a brand 130 may initiate the execution of other executable components 120a. These other executable components 120a may not be directly associated with a brand 130 in their container files 122a, for example, but are instead associated with the brand 130 during execution. The other executable components 120a will only access features 510 enabled according to the feature indicator 136 of the brand 130 associated with the initial executable component 120, even if the other executable components 120a would have accessed other features 512a, 512b if their execution was initiated in some other context. The initial executable component 120 is thus limited from accessing disabled features 512a, 512b using other executable components 120a.

Further, the other executable components 120a, 120b may initiate the execution of still other executable components, such as executable component 120b, even after the initial executable component 120 has finished execution. The execution system 100 keeps track of the brand 130 associated with the initial executable component 120, so that the features 510 accessible to all of these components 120, 120a, 120b will be determined according to the feature indicator 136 of that brand 130.

In some implementations, the execution system 100 processes multiple executable components 120 and associates a brand 130 with those executable components 120. For example, the execution system 100 may retain information pertaining to one executable component 120 after it has completed execution with the addition of a mechanism to retain this information for other executable components 120a. Further, the mechanism does not allow other components, or malicious actors, to access or alter the retained information, nor does the mechanism have additional elements that add unnecessary overhead or act as points of insecurity.

Figure 6A:
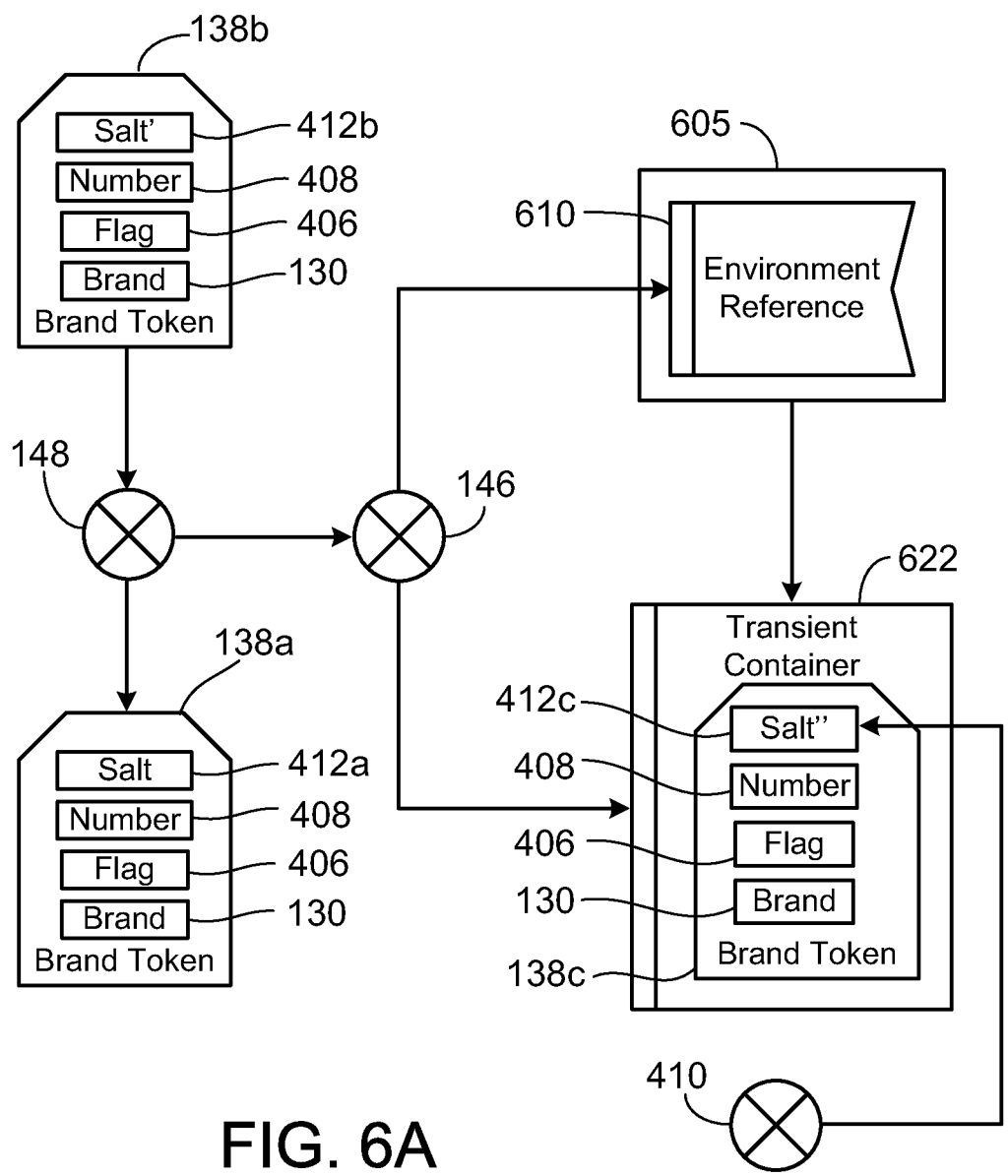
FIG. 6A is a portion of the execution system for generating another brand token.

As shown in FIG. 6A, the execution system 100 has an execution context module 146 that accepts information from the token verification module 148 about the contents of instances of a brand token 138a, 138b used to verify the brand 130 of an executable component 120. The execution context module 146 generates a transient container 622 and an environment reference 610 that points to the transient container 622. The environment reference 610 exists in the context of the execution environment 605 of the executable component 130. In some examples, the execution environment 605 contains memory locations, variables, data files, or other kinds of information pertinent to the execution of an executable component 120, or could contain any combination of these kinds of information.

The transient container 622 is not available to the execution system 100 at large. Instead, the transient container 622 is only available by accessing the environment reference 610. In turn, the environment reference 610 is only available in the execution environment 605 of the executable component 130. If the executable component 120 initiates the execution of another executable component 120a, the other executable component 120a is granted access to the environment reference 610, because it operates in same execution environment 605 as the executable component 120 responsible for initiating its execution. In some examples, the transient container 622 may be a data file not accessible using the normal file system of the execution system 100 without using the environment reference 610. The transient container 622 could be available to an executable component 120b handled by another execution system 100a.

The execution context module 146 uses the information acquired from the token verification module 148 to generate a new instance of the brand token 138c. This instance of the brand token 138c has the same brand 130, flag 406, and execution number 408 as do the other instances of the brand token 138a, 138b, and also has a new random salt 412c acquired from the random number generator 410. The execution context module 146 places the new instance of the brand token 138c inside the transient container 622.

Figure 6B:
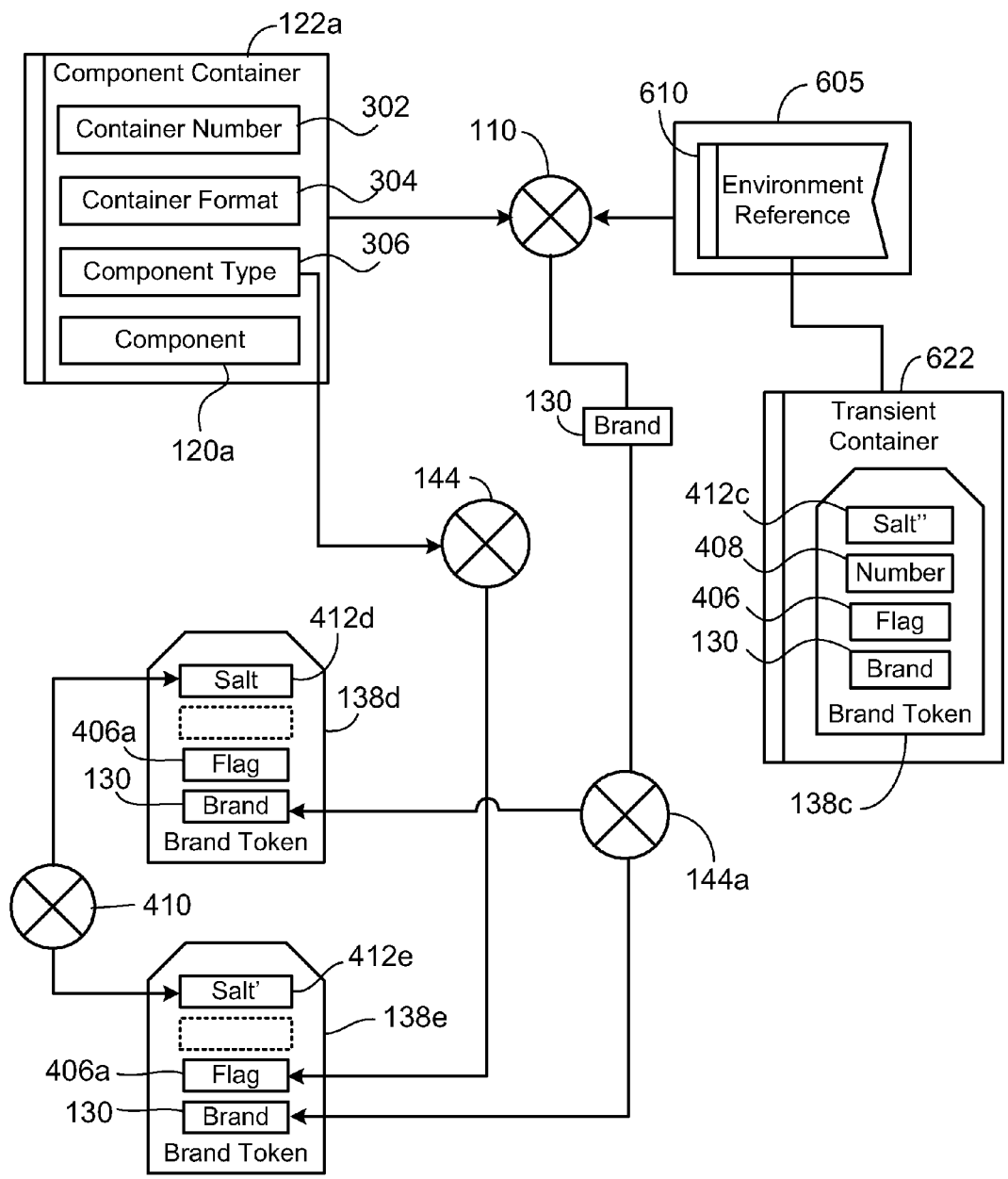
FIG. 6B is a portion of the execution system for accessing another brand token.

FIG. 6B shows a component container 122a that has an executable component 120a, but does not have a brand 130. The execution module 110 prepares the executable component 120a by accessing the execution environment 605 of the executable component. If this execution of this executable component 120a was initiated by another executable component 120, then this executable component 120a will be operating within the same execution environment 605 as the other executable component 120, and so an environment reference 610 to a transient container 622 will be available. The execution module 110 accesses the brand token instance 138c inside the transient container 622 and acquires the brand 130 in the brand token. The brand token instance 138c can also be compared to the other instances of the same brand token 138a, 138b to check its validity. For example, if a malicious actor has copied one of the other instances of the brand token 138a, 138b into the transient container 622, the instance of the brand token 138c in the transient container 622 will have the same random salt 412a, 412b as in the other instances, and can thus be identified as invalid.

The brand tokenization module 144, 144a activates and acquires the brand 130 from the execution module 110. The brand tokenization module is shown as two instances 144, 144a in the figure, but depending on the implementation, only one instance may be necessary. The brand tokenization module 144, 144a then constructs new instances of a brand token 138d, 138e, containing the brand 130, the flag 406a determined from the component type 306 in the component container 122a of the new executable component 120a, and new salts 412d, 412e acquired from the random number generator 410. These new instances of the brand token 138d, 138e are then used by the brand tokenization module 144, 144a to prepare the executable component 120 as described above with respect to FIGS. 4A-4C.

6 Procedures

Figure 7:
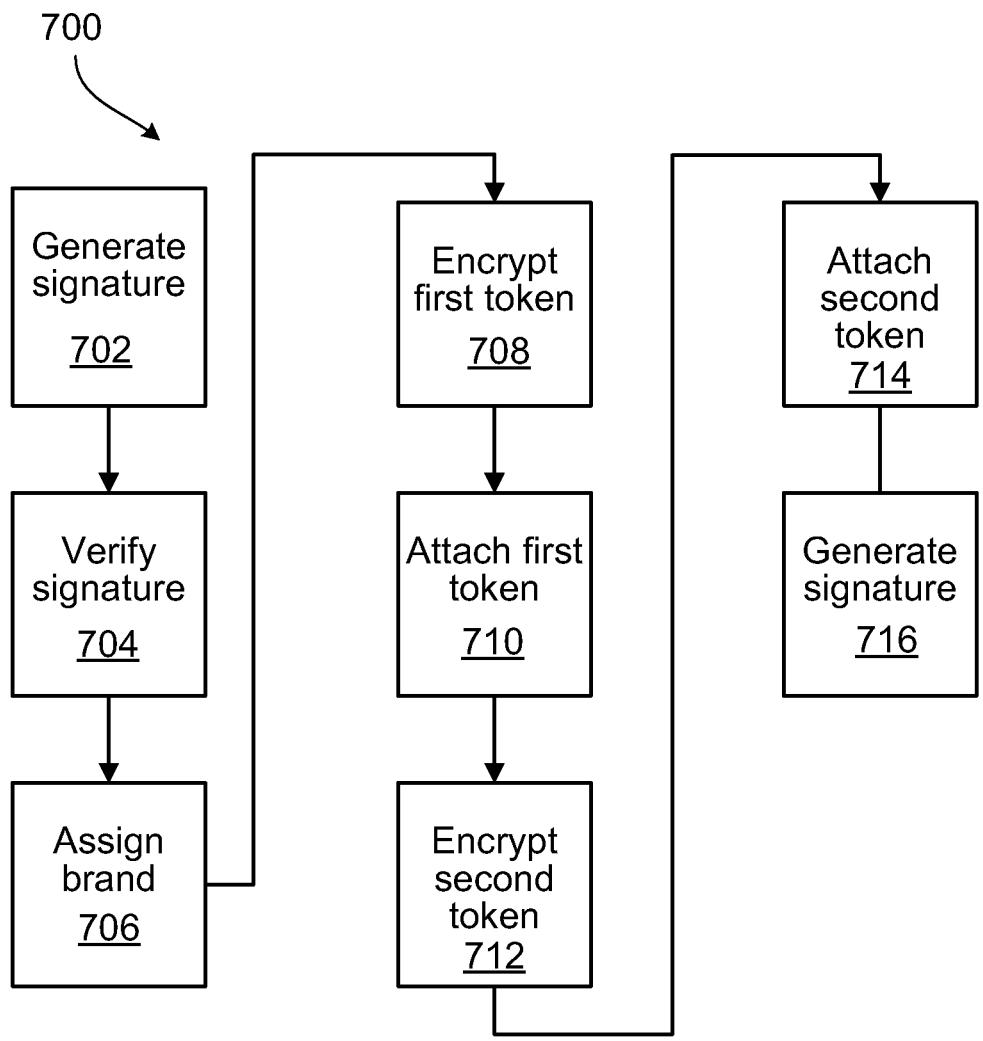
FIG. 7 is a flow chart for a procedure for assigning a brand.

FIG. 7 shows a flow chart for an exemplary procedure 700 used to cryptographically assign a brand 130 to an executable component 120. The procedure generates 702 a digital signature for a component container 122 based on the executable component 120 and the brand 130. The procedure verifies 704 the digital signature and assigns 706 the brand 130 to multiple instances of a brand token 138a, 138b. The procedure encrypts 708 one instance of the brand token 138a and attaches 710 it to an execution script 420. The procedure encrypts 712 the other instance of the brand token 138b and attaches 714 the encrypted brand token, along with the execution script 420, to a script container 430. The procedure generates 716 a digital signature for the script container 430 based on the script container 430.

Figure 8:
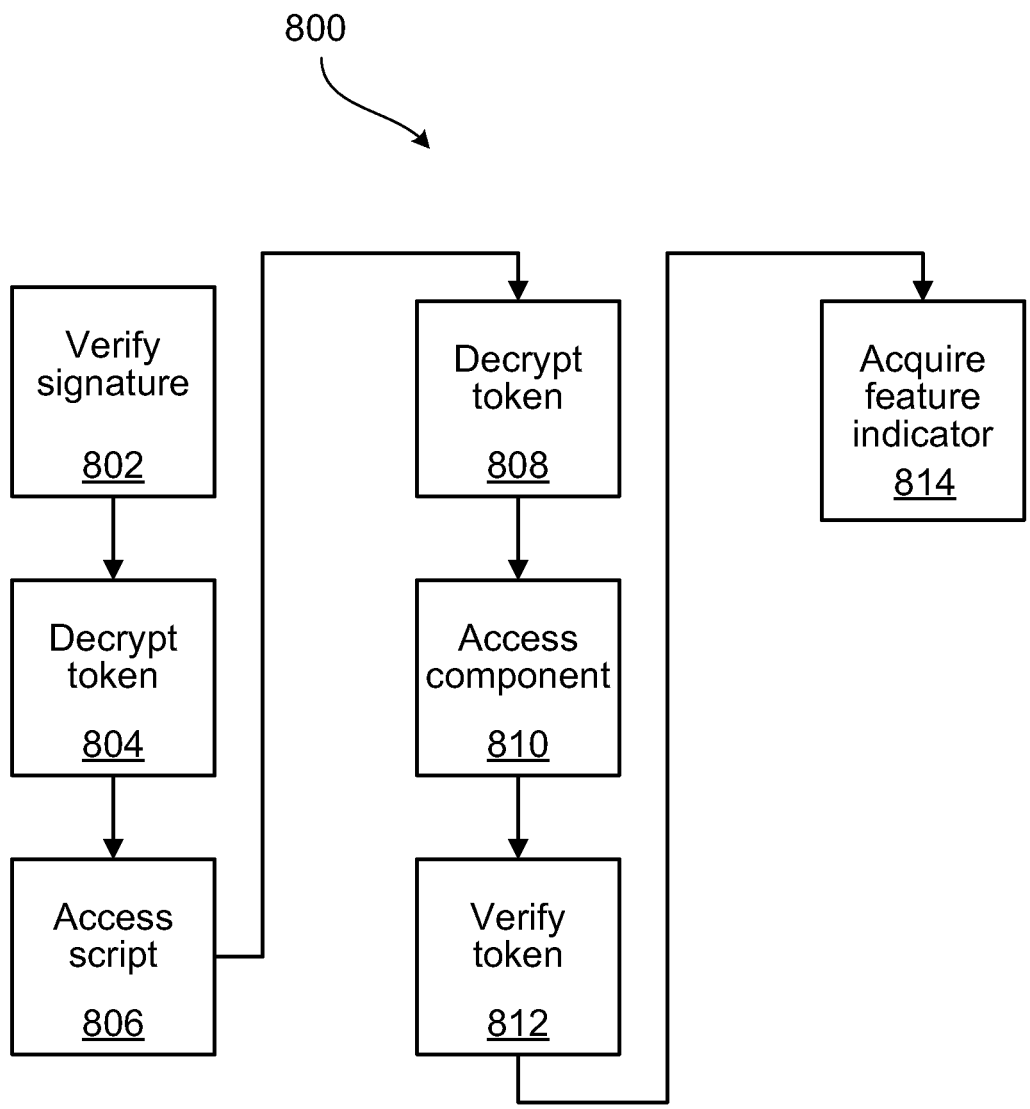
FIG. 8 is a flow chart for a procedure for accessing a feature indicator.

FIG. 8 shows a flow chart for an exemplary procedure 800 used to access the feature indicator 136 assigned to the brand 130. The procedure verifies 802 a digital signature and accesses a script container 430. The procedure decrypts 804 an instance of a brand token 138b and accesses 806 an execution script 420 in the script container 430. The procedure decrypts 808 another instance of the brand token 138a and accesses 810 an executable component 120 in the execution script 420. The procedure verifies 812 the two instances of the brand token 138a, 138b. Using the brand 130 in the brand token instances 138a, 138b, the procedure acquires 814 the feature indicator 136 assigned to the brand 130 in a key container 132.

Figure 9:
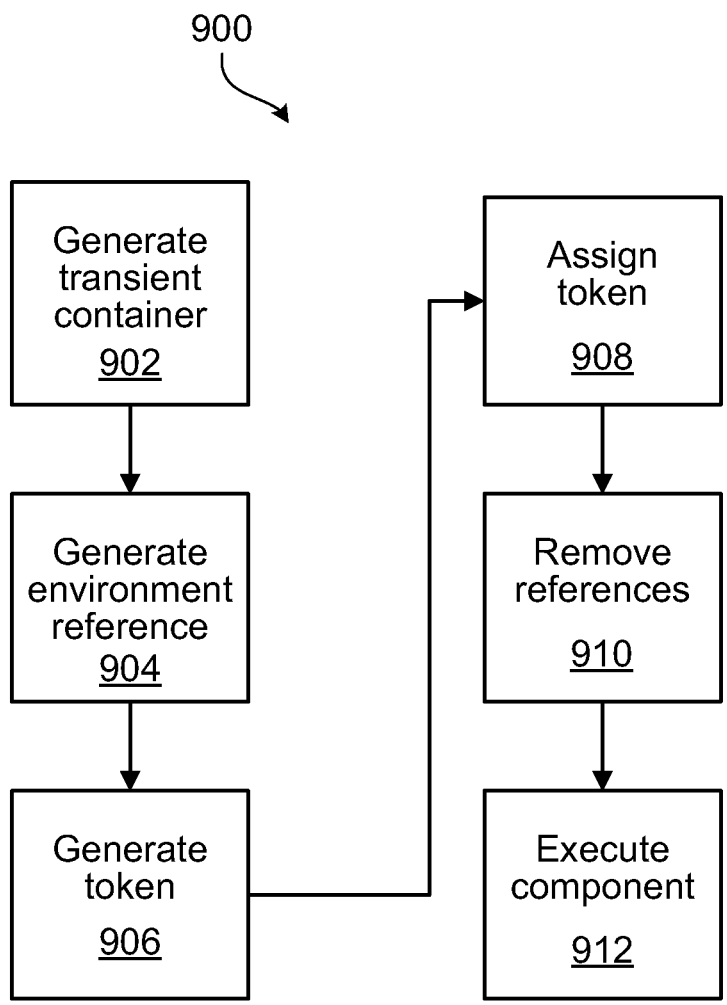
FIG. 9 is a flow chart for a procedure for executing an executable component.

FIG. 9 shows a flow chart for an exemplary procedure 900 used to execute an executable component 120 on an execution system 100. The procedure generates 902 a transient container 622 and generates 904 an environment reference pointing to the transient container 622. The procedure generates 906 an instance of a brand token 138c containing the brand 130 associated with the executable component 120. The procedure assigns 908 the instance of the brand token 138c to the transient container 622. The procedure removes 910 any other reference to the transient container 622 other than the environment reference 622. The procedure executes 912 the executable component 120 and places the environment reference 610 in the execution environment 605 of the executable component 120.

Figure 10:
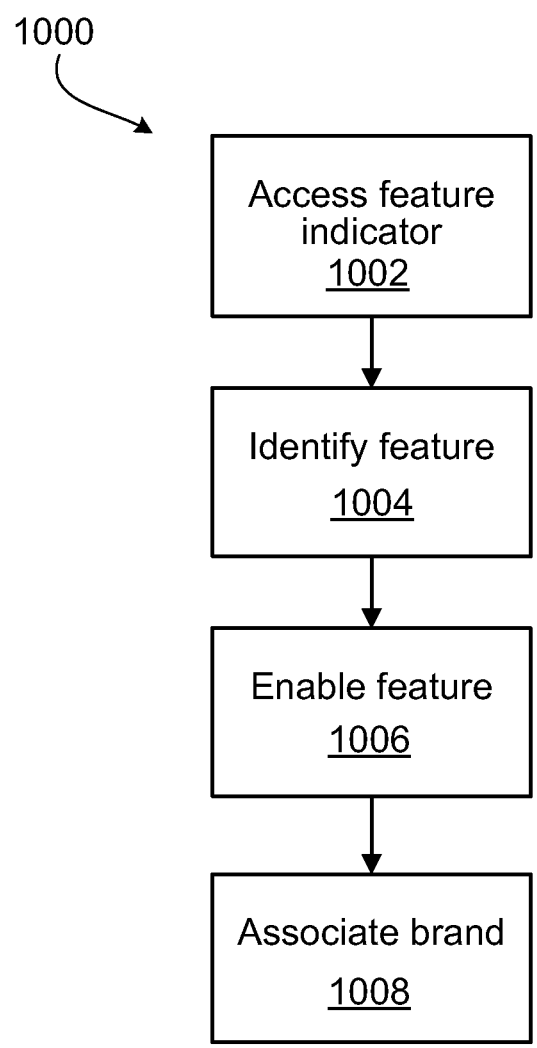
FIG. 10 is a flow chart for a procedure for providing access to a feature.

FIG. 10 shows a show chart for an exemplary procedure 1000 used to provide access to a feature 510 of an execution system, based on a feature indicator 136, to an executable component 120. The procedure accesses 1002 an acquired feature indicator 136 associated with a brand 130. The procedure identifies 1004 a feature 510 described by the feature indicator 136 and the corresponding feature 510 in a feature set 500 available to an execution system 100. The procedure enables 1006 the feature 510 for access by the executable component 120. The procedure associates 1008 the brand 130 with other executable components 120a which have execution initiated by the executable component 120.

7 Implementations

The approach for controlling access to computational features described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and pre-defined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method of controlling access to computational features, the method including:
    preparing a first computational resource for execution by an execution system that has been provided primary descriptors each associated with a respective identity value and each associated with a respective feature indicator;
    accessing a secondary descriptor containing a first identity value, the first identity value associated with a first primary descriptor of the primary descriptors, the secondary descriptor being cryptographically assigned to the first computational resource;
    accepting an instruction from the first computational resource to execute a second computational resource;
    cryptographically assigning at least one instance of the secondary descriptor containing the first identity value to the second computational resource, including combining the second computational resource with the instance of the secondary descriptor, and cryptographically signing the combination;
    granting the second computational resource access to a computational feature of the execution system based on the feature indicator associated with the instance of the secondary descriptor; and
    verifying, during an execution of the second computational resource, that the instance of the secondary descriptor is cryptographically assigned to the second computational resource, to determine that the second computational resource is authorized to access only the computational features enabled according to the feature indicator associated with the first computational resource.

2. The method of claim 1, wherein the computational resource is encrypted.

3. The method of claim 1, wherein cryptographically assigning the secondary descriptor to the first computational resource includes combining the first computational resource with the secondary descriptor, and cryptographically signing the combination.

4. The method of claim 3, wherein cryptographically signing the combination includes encrypting a value derived from the combination using a private encryption key assigned to the first primary descriptor.

5. The method of claim 1, wherein verifying the instance of the secondary descriptor includes decrypting a value derived from the combination of the second computational resource and the instance of the secondary descriptor using a public encryption key assigned to the first primary descriptor.

6. The method of claim 1, further including
    generating a first instance of the secondary descriptor before executing the first computational resource;
    generating a second instance of the secondary descriptor before executing the first computational resource; and
    comparing the two instances of the descriptor to determine if the first computational resource is authorized to execute.

7. The method of claim 6, further including encrypting the first instance of the secondary descriptor.

8. The method of claim 7, further including encrypting the second instance of the secondary descriptor.

9. The method of claim 6, wherein the first instance of the secondary descriptor has a first data value in common with the second instance of the secondary descriptor, and a second data value not in common with the second instance of the secondary descriptor.

10. The method of claim 6, further including
assigning to the first computational resource and the first instance of the secondary descriptor an first container having instructions to execute the first computational resource, and
assigning to the first container and the second instance of the secondary descriptor a second container representing as data the instructions to execute the first computational resource.

11. The method of claim 10, further including cryptographically signing the second container.

12. The method of claim 1, further including:
accepting an instruction from the first computational resource to access the second computational resource;
executing the second computational resource on a system;
cryptographically assigning the secondary descriptor to the second computational resource; and
providing access to a computational feature, based on the feature indicator, to the second executed computational resource.

13. The method of claim 12, wherein the second computational resource continues execution after the first computational resource has completed execution.

14. The method of claim 12, wherein the first computational resource is executed on a first system and the second computational resource is executed on a second system.

15. The method of claim 12, wherein cryptographically assigning the secondary descriptor to the second computational resource includes accessing a storage location containing an instance of the secondary descriptor.

16. The method of claim 1, further including:
accessing the second computational resource, cryptographically assigned to a second secondary descriptor containing a second identity value;
executing the second computational resource;
accessing a second feature indicator cryptographically assigned to a second primary descriptor containing a second identity value;
providing, to the executed second computational resource, access to a computational feature based on the second feature indicator.

17. The method of claim 1, wherein the second computational resource is authorized to access fewer computational features than it would otherwise be authorized to access if the execution of the second computational resource was not initiated by the first computational resource.

18. A system for controlling access to computational features, the system including:
a development computer system configured to prepare a first computational resource for execution including providing primary descriptors each associated with a respective identity value; and
an execution computer system configured to execute the computational resource, including
associating respective feature indicators with respective primary descriptors;
accessing a secondary descriptor containing a first identity value, the first identity value associated with a first primary descriptor of the primary descriptors, the secondary descriptor being cryptographically assigned to the first computational resource;
accepting an instruction from the first computational resource to execute a second computational resource;
cryptographically assigning at least one instance of the secondary descriptor containing the first identity value to the second computational resource, including combining the second computational resource with the instance of the secondary descriptor, and cryptographically signing the combination;
granting the second computational resource access to a computational feature of the execution system based on the feature indicator associated with the instance of the secondary descriptor; and
verifying, during an execution of the second computational resource, that the instance of the secondary descriptor is cryptographically assigned to the second computational resource, to determine that the second computational resource is authorized to access only the computational features enabled according to the feature indicator associated with the first computational resource.

19. The system of claim 18, wherein the computational resource is encrypted.

20. The system of claim 18, wherein cryptographically assigning the secondary descriptor to the first computational resource includes combining the first computational resource with the secondary descriptor, and cryptographically signing the combination.

21. The system of claim 18, wherein cryptographically signing the combination includes encrypting a value derived from the combination using a private encryption key assigned to the first primary descriptor.

22. The system of claim 18, wherein verifying the instance of the secondary descriptor includes decrypting a value derived from the combination of the second computational resource and the instance of the secondary descriptor using a public encryption key assigned to the first primary descriptor.

23. The system of claim 18, the execution of the first computational resource further including
generating a first instance of the secondary descriptor before executing the first computational resource;
generating a second instance of the secondary descriptor before executing the first computational resource; and
comparing the two instances of the descriptor to determine if the first computational resource is authorized to execute.

24. The system of claim 18, wherein the second computational resource continues execution after the first computational resource has completed execution.

25. The system of claim 18, wherein the second computational resource is authorized to access fewer computational features than it would otherwise be authorized to access if the execution of the second computational resource was not initiated by the first computational resource.

26. A system for controlling access to computational features, the system including:
means for preparing a first computational resource for execution including providing primary descriptors each associated with a respective identity value; and
means for executing the computational resource, including
associating respective feature indicators with respective primary descriptors;
accessing a secondary descriptor containing a first identity value, the first identity value associated with a first primary descriptor of the primary descriptors, the secondary descriptor being cryptographically assigned to the first computational resource;

accepting an instruction from the first computational resource to execute a second computational resource;

cryptographically assigning at least one instance of the secondary descriptor containing the first identity value to the second computational resource, including combining the second computational resource with the instance of the secondary descriptor, and cryptographically signing the combination;

granting the second computational resource access to a computational feature of an execution system based on the feature indicator associated with the instance of the secondary descriptor; and verifying, during an execution of the second computational resource, that the instance of the secondary descriptor is cryptographically assigned to the second computational resource, to determine that the second computational resource is authorized to access only the computational features enabled according to the feature indicator associated with the first computational resource.

27. A non-transitory computer-readable medium storing a computer program for controlling access to computational features, the computer program including instructions for causing a computer to:

prepare a first computational resource for execution by an execution system that has been provided primary descriptors each associated with a respective identity value and each associated with a respective feature indicator;

access a secondary descriptor containing a first identity value, the first identity value associated with a first primary descriptor of the primary descriptors, the secondary descriptor being cryptographically assigned to the first computational resource;

accept an instruction from the first computational resource to execute a second computational resource;

cryptographically assign at least one instance of the secondary descriptor containing the first identity value to the second computational resource, including combining the second computational resource with the instance of the secondary descriptor, and cryptographically signing the combination;

grant the second computational resource access to a computational feature of the execution system based on the feature indicator associated with the instance of the secondary descriptor; and verify, during an execution of the second computational resource, that the instance of the secondary descriptor is cryptographically assigned to the second computational resource, to determine that the second computational resource is authorized to access only the computational features enabled according to the feature indicator associated with the first computational resource.

28. The computer-readable medium of claim 27, wherein the computational resource is encrypted.

29. The computer-readable medium of claim 27, wherein cryptographically assigning the secondary descriptor to the first computational resource includes combining the first computational resource with the secondary descriptor, and cryptographically signing the combination.

30. The computer-readable medium of claim 27, wherein cryptographically signing the combination includes encrypting a value derived from the combination using a private encryption key assigned to the first primary descriptor.

31. The computer-readable medium of claim 27, wherein verifying the instance of the secondary descriptor includes decrypting a value derived from the combination of the second computational resource and the instance of the secondary descriptor using a public encryption key assigned to the first primary descriptor.

32. The computer-readable medium of claim 27, further including instructions for causing the computer to generate a first instance of the secondary descriptor before executing the first computational resource;

generate a second instance of the secondary descriptor before executing the first computational resource; and compare the two instances of the descriptor to determine if the first computational resource is authorized to execute.

33. The computer-readable medium of claim 27, wherein the second computational resource continues execution after the first computational resource has completed execution.

34. The computer-readable medium of claim 27, wherein the second computational resource is authorized to access fewer computational features than it would otherwise be authorized to access if the execution of the second computational resource was not initiated by the first computational resource.

* * * * *